(12) United States Patent
Klaehn et al.

(10) Patent No.: US 10,367,229 B2
(45) Date of Patent: Jul. 30, 2019

(54) PHOSPHORANIMINE COMPOUNDS, ELECTROLYTE SOLUTIONS INCLUDING A PHOSPHORANIMINE COMPOUND, AND ENERGY STORAGE DEVICES INCLUDING SAME

(71) Applicant: BATTELLE ENERGY ALLIANCE, LLC., Idaho Falls, ID (US)

(72) Inventors: John R Klaehn, Idaho Falls, ID (US); Eric J Dufek, Ammon, ID (US); Joshua S McNally, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 970 days.

(21) Appl. No.: 14/817,511

(22) Filed: Aug. 4, 2015

(65) Prior Publication Data

US 2017/0040638 A1 Feb. 9, 2017

(51) Int. Cl.
| | |
|---|---|
| *H01M 10/0567* | (2010.01) |
| *H01M 10/0525* | (2010.01) |
| *H01G 11/60* | (2013.01) |
| *H01G 11/64* | (2013.01) |
| *H01G 11/62* | (2013.01) |

(52) U.S. Cl.
CPC ........ *H01M 10/0567* (2013.01); *H01G 11/60* (2013.01); *H01G 11/64* (2013.01); *H01M 10/0525* (2013.01); *H01G 11/62* (2013.01); *Y02E 60/13* (2013.01)

(58) Field of Classification Search
CPC ........ H01G 11/60; H01G 11/62; H01G 11/64; H01M 10/0525; H01M 10/0567; Y02E 60/13
See application file for complete search history.

(56) References Cited

U.S. PATENT DOCUMENTS

| | | | |
|---|---|---|---|
| 2012/0164541 A1* | 6/2012 | Darolles | H01M 6/164 429/326 |
| 2013/0089793 A1 | 4/2013 | Gering et al. | |

OTHER PUBLICATIONS

Blackstone et al., "A Cooperative Role for the Counteranion in the PCl5-Initiated Living, Cationic Chain Growth Polycondensation of the Phosphoranimine Cl3P=NSiMe3," Journal of the American Chemical Society, 134, 2012, pp. 15293-15296.
Burford et al., "Nucleophilic Addition of CH, NH, and OH Bonds to the Phosphadiazonium Cation and Interpretation of 31P Chemical Shifts at Dicoordinate Phosphorus Centers," Inorg. Chem., 1996, 35, pp. 5460-5467.
Cytec, Alkylphosphines, http://www.cytec.com/businesses/in-process-separation/phosphine-specialties/products/alkylphosphines, visited Aug. 4, 2015.

(Continued)

*Primary Examiner* — Lingwen R Zeng
(74) *Attorney, Agent, or Firm* — TraskBritt

(57) ABSTRACT

A phosphoranimine compound comprising a cationic portion bonded to a nitrogen atom of the phosphoranimine compound, a phosphorus atom bonded to the nitrogen atom, pendant groups bonded to the phosphorus atom, and a counterion. An electrolyte solution comprising at least one phosphoranimine compound is also disclosed, as is an energy storage device including the electrolyte solution.

21 Claims, 2 Drawing Sheets

(56) References Cited

OTHER PUBLICATIONS

Cytec, Cyphos, http://www.cytec.com/businesses/in-process-separation/phosphine-specialties/brands/cyphos, visited Aug. 4, 2015.

Cytec, Cytop, http://www.cytec.com/businesses/in-process-separation/phosphine-specialties/brands/cytop, visited Aug. 4, 2015.

Cytec, Phosphonium Salts & Ionic Liquids, http://www.cytec.com/businesses/in-process-separation/phosphine-specialties/products/phosphonium-salts-ionic-liquids, visited Aug. 4, 2015.

Dielmann et al., "Crystalline, Lewis Base-Free, Cationic Phosphoranimines (Iminophosphonium Salts)," J. Am. Chem. Soc., 135, 2013, pp. 14071-14073.

Huynh et al., "Synthesis, Structures, and Stability of N-Donor-Stabilized N-Silylphosphoranimine Cations," Chem. Eur. J., 13, 2007, pp. 3431-3440.

Huynh et al., "Synthesis and Reactivity of Phosphine-Stabilized Phosphoranimine Cations, [R3P.PR'2=NSiMe3]," J. Am. Chem. Soc., 131, 2009, pp. 7905-7916.

Huynh et al., "Donor-stabilised cations, phosphinamide anions, and unusual oxidative cyclisation products from halogenated phosphoranimines and phosphinimines with a bulky 2,4,6-tri-tert-butylphenyl substituent at nitrogen," Dalton Trans., 40, 2011, pp. 10576-10584.

U.S. Appl. No. 14/720,493, filed May 22, 2015, titled "Electrolyte Solutions Including a Phosphoranimine Compound, and Energy Storage Devices Including Same," by Klaehn et al.

U.S. Appl. No. 62/002,659, filed May 23, 2014, titled "Electrolyte Solutions Including a Phosphoranimine Compound, and Energy Storage Devices Including Same," by Klaehn et al.

* cited by examiner

PHOSPHORANIMINE COMPOUNDS, ELECTROLYTE SOLUTIONS INCLUDING A PHOSPHORANIMINE COMPOUND, AND ENERGY STORAGE DEVICES INCLUDING SAME

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates generally to chemistry and to chemical compounds for use in electrolyte solutions. More specifically, the disclosure, in various embodiments, relates to phosphoranimine compounds, electrolyte solutions including a phosphoranimine compound, and to energy storage devices including the electrolyte solution.

BACKGROUND

Lithium-ion batteries play a vital role in the development of many energy-dependent applications, such as electric vehicles, portable electronics, and renewable energy storage. However, with the wide adoption of lithium-ion batteries over the last two decades, technology limitations that impede more widespread implementation of lithium-ion batteries have become evident. Foremost concerns deal with insufficient energy storage, poor safety, high cost, and inadequate lifetime of lithium-ion batteries, with ancillary issues including poor low temperature performance and problematic recyclability.

Electrolyte solutions used in lithium-ion batteries are known to be unstable at high temperatures and high voltages. Over time, the electrolyte solution turns into a tar-like material at high temperatures, which has precluded the widespread implementation of lithium-ion batteries in vehicular applications, such as in hybrid electric vehicles (HEVs) and plug-in type hybrids (PHEVs). The electrolyte solutions include carbonate-based solvents, such as dimethyl carbonate (DMC), ethylene carbonate (EC), or ethyl methyl carbonate (EMC). However, the carbonate-based solvents are problematic due to their high volatility, flammability, and decomposition at even modestly elevated temperatures, such as low as 60° C.

To reduce the flammability of the electrolyte solution, organophosphorus compounds, such as phosphates and cyclic phosphazenes, have been investigated as an additive or co-solvent to the electrolyte solution. Phosphoranimine compounds are known in the art to be synthetic intermediates (e.g., precursors) in the formation of polyphosphazene compounds or cyclic phosphazene compounds by the Staudinger reaction or by the Neilson and Wisian-Neilson methods. Phosphoranimine compounds are also known in the art as iminophosphonium compounds. However, beyond being synthetic intermediates, phosphoranimine compounds have thus far seen few uses themselves due to their reactivity, which makes the phosphoranimine compound unstable in air and water.

Phosphoranimine compounds have been disclosed for use in positive electrodes of lithium primary cells and for use in electrolyte solutions in combination with an aprotic organic solvent. The phosphoranimine compound includes a phosphorus-containing group, such as a phosphine oxide group, a sulfur-containing group, such as a sulfone group, or a nitrogen-containing group directly bonded to a nitrogen atom of the phosphoranimine compound.

A phosphazene ionic liquid is described in U.S. Patent Application Publication No. 2013/0089793 to Gering et al. The phosphazene ionic liquid can include a positively charged pendant group bonded to a phosphorus atom of the phosphazene ring, a positively charged nitrogen atom of the phosphazene ring, or a positively charged phosphorus atom of the phosphazene ring.

It would be desirable to further improve electrolyte solutions to advance the usefulness of lithium-ion, and other, batteries.

BRIEF SUMMARY

An embodiment of the disclosure comprises a phosphoranimine compound comprising a cationic portion bonded to a nitrogen atom of the phosphoranimine compound, a phosphorus atom bonded to the nitrogen atom, pendant groups bonded to the phosphorus atom, and a counterion.

Another embodiment of the disclosures comprises an electrolyte solution comprising at least one phosphoranimine compound and a metal salt. The at least one phosphoranimine compound comprises a cationic portion bonded to a nitrogen atom of the phosphoranimine compound, a phosphorus atom bonded to the nitrogen atom, pendant groups bonded to the phosphorus atom, and a counterion.

Yet another embodiment of the disclosure includes an energy storage device comprising a positive electrode, a negative electrode, a separator between the positive electrode and the negative electrode, and an electrolyte solution. The electrolyte solution comprises at least one phosphoranimine compound comprising a cationic portion bonded to a nitrogen atom, a phosphorus atom bonded to the nitrogen atom, pendant groups bonded to the phosphorus atom, and a counterion.

DETAILED DESCRIPTION

Figure 1:
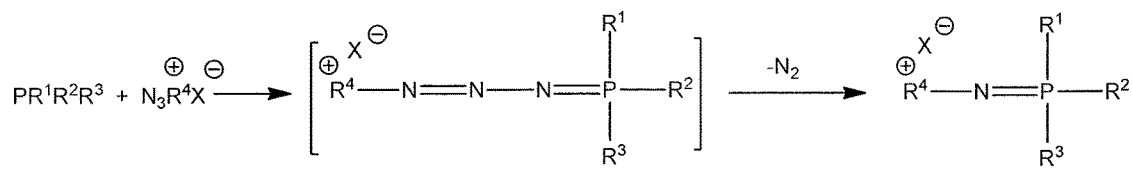
FIG. 1 illustrates a general method of synthesizing phosphoranimine compounds according to embodiments of the disclosure.

A phosphoranimine compound for use as an electrolyte (e.g., in an electrolyte solution) is disclosed, as are energy storage devices including the phosphoranimine compound. The phosphoranimine compound is an ionic liquid at room temperature and has a cationic pendant group on a nitrogen atom of the phosphoranimine compound. At least one phosphoranimine compound is used as an additive or co-solvent in the electrolyte solution, or as a primary solvent in the electrolyte. The phosphoranimine compound is used to transport ions between electrodes of the energy storage device. The phosphoranimine compound may function as a replacement for all or a portion of an organic solvent used in a conventional energy storage device, such as in a battery or capacitor. Using the phosphoranimine compound in the electrolyte or electrolyte solution may improve safety and provide a capability to operate the energy storage device with higher energy electrodes and high voltages. The phosphoranimine compound may exhibit sufficient metal stability, metal salt solubility, and viscosity to be used as the electrolyte. The phosphoranimine compound may also have sufficient electrochemical stability for use in the energy storage device.

The phosphoranimine compound has an overall neutral charge and is an ionic compound that includes a cationic portion and an anionic portion. The cationic portion is bonded to the nitrogen atom of the phosphoranimine compound. The phosphoranimine compound is a liquid at room temperature (from about 20° C. to about 25° C.) and a liquid at a temperature range at which the phosphoranimine compound is to be used, such as at an operating temperature of the energy storage device including the phosphoranimine compound. Functional groups (e.g., pendant groups) on the phosphoranimine compound are selected so that none are good leaving groups, producing the phosphoranimine compound that is substantially unreactive and has increased stability in water and air. The phosphoranimine compound may also be a flame retardant.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the term "alkyl" means and includes a saturated, unsaturated, straight, branched, or cyclic hydrocarbon containing from one carbon atom to ten carbon atoms. Examples include, but are not limited to, methyl, ethyl, propyl (n-propyl, isopropyl, cyclopropyl), butyl (n-butyl, isobutyl, sec-butyl, tert-butyl, cyclobutyl), pentyl (n-pentyl, tert-pentyl, neopentyl, isopentyl, sec-pentyl, 3-pentyl, cyclopentyl), hexyl (isohexyl, cyclohexyl, 3-methylpentyl, 2,2-dimethylbutyl, 2,3-dimethylbutyl), heptyl, octyl, nonyl, or decyl.

The terms "alkenyl" and "alkynyl" mean and include a straight, branched, or cyclic hydrocarbon containing from 2 carbon atoms to 6 carbon atoms with at least one double or at least one triple bond, respectively.

The term "alkoxy" means and includes an alkyl group linked to an oxygen atom. The alkoxy group may include, but is not limited to, a methoxy group, an ethoxy group, a propoxy group, a butoxy group, a pentoxy group, a hexoxy group, a heptoxy group, an octoxy group, a nonoxy group, or a decoxy group, or an alkoxy-substituted alkoxy group (i.e., a polyether group), such as a methoxy methoxy group, a methoxy ethoxy group, an ethoxy methoxy, an ethoxy ethoxy group, a methoxy ethoxy ethoxy group, etc.

The terms "alkylamino" or "dialkylamino" mean and include an amino group having one or two alkyl substituents, respectively.

The term "alkylarylamino" means and includes an alkyl group with an aryl substituent and an amino substituent.

The term "alkylthio" means and includes an alkyl group with a thio substituent.

The term "alkarylthio" means and includes an alkyl group and an aryl group linked to a sulfur atom.

The term "aryl" means and includes a phenyl group, a tolyl group, or a naphthyl group or a substituted phenyl group, a substituted tolyl group, or a substituted naphthyl group, wherein the substituent is a halo, alkyl, alkoxy, alkylthio, amide, amino, alkylamino, dialkylamino, haloalkyl, hydroxyalkyl, alkoxyalkyl, methylenedioxy, cyano, C(O)(lower alkyl), —$CO_2H$, —$SO_3H$, or —$CO_2$, and wherein the aryl group can have up to four substituents. The aryl group may also contain a heteroatom, such as sulfur (thiophene, benzothiophene, etc.), oxygen (furan, benzofuran, etc.), or nitrogen (pyrrole, indole, pyridine, pyrimidine, imidazole, imidazoline, pyrazole, etc.).

The terms "arylamino" and "diarylamino" mean and include an amino group having one or two aryl substituents, respectively.

The term "aryloxy" means and includes an aryl group linked to an oxygen atom. The aryloxy group may include, but is not limited to, a phenoxy group, a methylphenoxy group, or a methoxy phenoxy group.

The term "aralkyl" means and includes an aryl group with an alkyl substituent.

The term "alkaryl" means and includes an alkyl group with an aryl substituent. Examples include, but are not limited to, benzyl, substituted benzyl, phenethyl, or substituted phenethyl, wherein the substituents are as defined above for aryl groups.

The term "alkaryloxy" means and includes an alkyl group and an aryl group linked to an oxygen atom.

The term "aralkoxy" means and includes an aryl group and an alkyl group linked to an oxygen atom.

The term "arylthio acyl" means and includes an aryl group with a thio substituent and an acyl substituent.

The term "acylamino" means and includes an acyl group with an amino substituent.

The term "acyloxy" means and includes an acyl group bonded to an oxygen atom.

As used herein the term "electrolyte" means and includes an ionic conductor, which can be in a solid state, a liquid state, or a gas state (e.g., plasma).

As used herein, the term "energy storage device" means and includes a device configured and comprising materials formulated to convert stored chemical energy into electrical energy or electrical energy into chemical energy. The energy storage device may include, but is not limited to, a battery or a capacitor. By way of example only, the energy storage device may be a lithium-ion battery, a lithium metal battery, a sodium-ion battery, a sodium metal battery, a magnesium-ion battery, a magnesium metal, an ultracapacitor, or a supercapacitor. Such devices are known in the art and, therefore, are not described in detail herein.

The term "glycol" means and includes a hydrocarbon containing two hydroxyl groups.

The terms "halo" or "halogen" mean and include fluoro, chloro, bromo, or iodo.

The term "heteroalkyl" means and includes an alkyl group that includes a heteroatom such as oxygen, sulfur, or nitrogen (with valence completed by hydrogen or oxygen) in the carbon chain or terminating the carbon chain.

The term "heteroaralkyl" means and includes an aromatic moiety that includes at least one sulfur atom, oxygen atom, or nitrogen atom in the aromatic ring.

The term "heteroaryl" means and includes an aromatic moiety that includes at least one sulfur atom, at least one oxygen atom, or at least one nitrogen atom in the aromatic ring, and that can be optionally substituted as described above for aryl groups. Examples include, but are not limited to, furyl, pyridyl, pyrimidyl, thienyl, isothiazolyl, imidazolyl, imidazolinyl, tetrazolyl, pyrazinyl, benzofuranyl, benzothiophenyl, quinolyl, isoquinolyl, benzothienyl, isobenzofuryl, pyrazolyl, indolyl, isoindolyl, benzimidazolyl, purinyl, carbozolyl, oxazolyl, thiazolyl, isothiazolyl, 1,2,4-thiadiazolyl, isooxazolyl, pyrrolyl, pyrazolyl, quinazolinyl, pyridazinyl, pyrazinyl, cinnolinyl, phthalazinyl, quinoxalinyl, xanthinyl, hypoxanthinyl, pteridinyl, 5-azacytidinyl, 5-azauracilyl, triazolopyridinyl, imidazolopyridinyl, pyrrolopyrimidinyl, and pyrazolopyrimidinyl.

The term "oxy(aliphatic)" means and includes an oxygen atom linked to an aliphatic group. The term "aliphatic" means and includes a non-aromatic compound formed of hydrogen and carbon and collectively refers to an alkyl, alkenyl, or alkynyl group.

The term "oxy(aliphatic)hydroxyl" means and includes an oxygen atom linked to an aliphatic group and a hydroxyl group.

The term "oxy(alkyl)hydroxyl" means and includes an oxygen atom linked to an alkyl group and a hydroxyl group.

The term "oxycarbonyl" means and includes an oxygen atom linked to a carbonyl group.

The term "oxysulfonyl" means and includes an oxygen atom linked to a sulfonyl group.

The term "perfluoroalkyl" means and includes an alkyl group in which each of the hydrogen atoms is substituted with fluorine.

The saccharide is a monosaccharide or a disaccharide. The term "monosaccharide" means and includes a sugar, such as glucose, fructose, galactose, xylose, ribose, arabinose, lyxose, ribulose, xylulose, or mannose. The term "disaccharide" means and includes a sugar containing two monosaccharides. The disaccharide may, for example, be sucrose, lactose, or maltose.

The term "sulfonamido" means and includes a sulfonyl group bonded to an amido group.

The term "sulfonylamino" means and includes a sulfonyl group bonded to an amino group.

The term "sulfoxide" means and includes a compound in which a sulfur and oxygen atom are bonded to one another and 2 carbon atoms are bonded to the sulfur atom.

The term "thioaralkyl" means and includes an aryl group and an alkyl group linked to a sulfur atom.

The term "trifluoroalkyl" means and includes an alkyl group with a trifluoro substituent.

The phosphoranimine compound is an acyclic (e.g., linear) compound that includes a double bond between a phosphorus atom and a nitrogen atom of the phosphoranimine compound. Three pendant groups (e.g., $R^1$, $R^2$, $R^3$) are bonded to the phosphorus atom, and the cationic pendant group (e.g., $^+R^4$) is bonded to the nitrogen atom. A counterion (e.g., $X^-$) is also present. The phosphoranimine compound is a monomeric phosphazene compound having the general chemical formula $^+R^4N{=}PR^1R^2R^3X^-$ and the general chemical structure shown below:

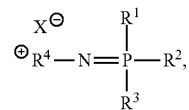

where each of $R^1$, $R^2$, and $R^3$ is the pendant group bonded to the phosphorus atom, $R^4$ is the cationic pendant group bonded to the nitrogen atom, and X is an organic or inorganic counterion configured to form a salt of the phosphoranimine compound. The anionic portion of the phosphoranimine compound includes the nitrogen atom, the phosphorus atom, the pendant groups $R^1$–$R^3$, and the counterion $X^-$, and the cationic portion of the phosphoranimine compound is represented in the chemical structure above by "$^+R^4$."

The phosphoranimine compound having the general chemical formula above may also be represented by the resonance structure shown below:

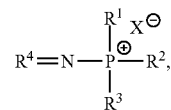

where the positive charge resonates from the cationic portion bonded to the nitrogen atom of the phosphoranimine compound through the phosphorus-nitrogen double bond, resulting in a positive charge on the phosphorus atom of the phosphoranimine compound. When general chemical formulas and specific chemical structures of phosphoranimine compounds are provided herein, it is understood that the phosphoranimine compound includes appropriate resonance structure(s) as well as the indicated phosphoranimine compound.

Each of $R^1$, $R^2$, and $R^3$ is independently selected from an acyl group, an acylamino group, an acyloxy group, an alkyl group, an alkenyl group, an alkynyl group, an alkoxy group, an amino group, an alkylamino group, an alkylarylamino group, a dialkylamino group, an alkylthio group, an alkarylthio group, an aryl group, an arylamino group, a diarylamino group, an aryloxy group, an aralkyl group, an alkaryl group, an aralkoxy group, an alkaryloxy group, an arylthio group, an arylthio acyl group, an amino acid group, a carbamoyl group, a carbonamido group, a carboxyl group, a cyano group, a formyl group, a glycol group, a heteroalkyl group, a heteroaralkyl group, a heteroaryl group, a hydroxyl group, a nitro group, an organosilicon group, such as an alkylorganosilane (—$(CH_2)_x$—$SiR_3$) with the alkyl group bonded to the phosphorus atom, an oxy(aliphatic) group, an oxy(aliphatic)hydroxyl group, an oxy(alkyl)hydroxyl group, an oxycarbonyl group, an oxysulfonyl group, a perfluoroalkyl group, a phosphate group, a saccharide group, a sulfamoyl group, a sulfonamido group, a sulfonylamino group, a sulfonyl group, a sulfoxide group, a thio group, a thioalkaryl group, a thioaralkyl group, a trifluoroalkyl group, or an ureido group. Any of the above-mentioned groups may be further substituted with at least one substituent, such as with a halogen, sulfonyl, or phosphate moiety. Each of $R^1$, $R^2$, and $R^3$ may be the same as, or different from, one another. By way of example only, polyether (methoxyethoxy or 2-methoxyethoxy), carboxyl, carbonyl, carbonate, amine, or other keto functional groups may be present as substituents on the pendant groups bonded to the phosphorus atom. In one embodiment, the pendant group bonded to the phosphorus atom is an ethyl group. In another embodiment, the pendant group bonded to the phosphorus atom is a 2-methoxyethoxyethoxy group. In yet another embodiment, the pendant group bonded to the phosphorus atom is an octyl group. In still yet another embodiment, the pendant group bonded to the phosphorus atom is a phenyl group.

In one embodiment, at least two of $R^1$, $R^2$, and $R^3$ are the same. In another embodiment, each of $R^1$, $R^2$, and $R^3$ is different from each other. In yet another embodiment, all of $R^1$, $R^2$, and $R^3$ are the same. To improve stability, the phosphoranimine compound may not include a halogen atom directly bonded to the phosphorus atom, i.e., $R^1$, $R^2$, and $R^3$ may not be a halogen atom. However, a halogen may be a substituent on one of the above-mentioned groups for $R^1$, $R^2$, or $R^3$.

$R^4$ is the cationic pendant group and may include, but is not limited to, an imidazolium group, an imidazolinium group, a phosphonium group, an ammonium group, a sulfonium group, a triazolium group, a thiazolium group, a pyridium group, a pyridinium group, an isoquinolinium group, a pyrrolidinium group, a pyrrolium group, a piperidinium group, or a pyrazolium group. The cationic pendant group may be an amine, such as a primary amine, a secondary amine, or a tertiary amine. The cationic pendant group may be further substituted with at least one substituent, such as an alkyl group, an aryl group, an alkoxy group, an aryloxy group, a halide group, or combinations thereof. In one embodiment, the cationic pendant group is an imidazolinium group, such as a dimethylimidazolinium group.

The counterion (e.g., $X^-$) of the phosphoranimine compound may be a lithium-ion-type anion including, but not limited to, tetrafluoroborate ($BF_4^-$), hexafluorophosphate ($PF_6^-$), bis(oxalate)borate ($BOB^-$), hexafluoroarsenate ($AsF_6^-$), hexafluoroantimonate ($SbF_6^-$), tetrachloroaluminate ($AlCl_4^-$), hydrogen sulfate ($HSO_4^-$), perchlorate ($ClO_4^-$), mesylate ($CH_3SO_3^-$), chloride ($Cl^-$), bromide ($Br^-$), iodide ($I^-$), an alkyl halide, or a perhalogenated alkyl halide of a group VA element. Other anionic species may also be used, such as trifluoromethanesulfonyl imide ($N(SO_2CF_3)_2^-$), trifluoromethanesulfonate ($CF_3SO_3^-$), or trifluoroacetate ($CF_3CO_2^-$). In one embodiment, the counterion is hexafluorophosphate. If the phosphoranimine compound is to be used as an additive in the electrolyte solution, a common anion, such as chloride, may be paired with the cationic portion of the phosphoranimine compound.

In one embodiment, the phosphoranimine compound is P,P-[bis(2-methoxyethoxyethoxy)-P-ethylphosphoraniminyl-N-1,3-dimethylimidazolinium hexafluorophosphate and has the chemical structure:

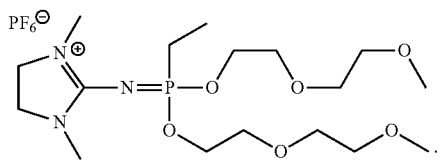 [SMILES: "PF6" ; CCP(=NC1=[N+](C)CCN1C)(OCCOCCOC)OCCOCCOC]

The phosphoranimine compound may also be represented by the resonance structure shown below:

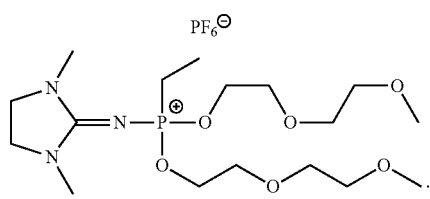 [SMILES: CC[P+](N=C1N(C)CCN1C)(OCCOCCOC)OCCOCCOC ; "PF6"]

In another embodiment, the phosphoranimine compound is P,P,P-tri-n-octylphosphoraniminyl-N-1,3-dimethylimidazolinium hexafluorophosphate and has the chemical structure:

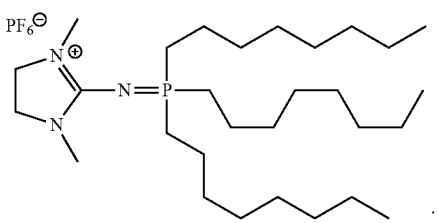 [SMILES: "PF6" ; CCCCCCCCP(CCCCCCCC)(CCCCCCCC)=NC1=[N+](C)CCN1C]

The phosphoranimine compound may also be represented by the resonance structure shown below:

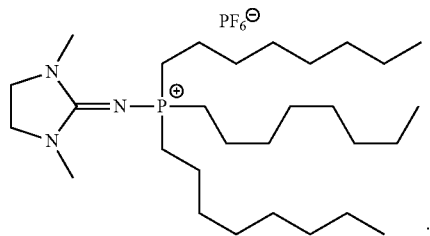 [SMILES: CCCCCCCC[P+](CCCCCCCC)(CCCCCCCC)N=C1N(C)CCN1C ; "PF6"]

In yet another embodiment, the phosphoranimine compound is P,P,P-triphenylphosphoraniminyl-N-1,3-dimethylimidazolinium hexafluorophosphate and has the chemical structure:

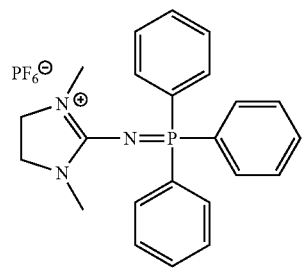

The phosphoranimine compound may also be represented by the resonance structure shown below:

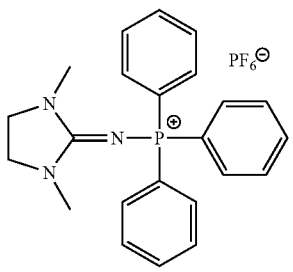

The cationic portion and the anionic portion of the phosphoranimine compound may be selected such that the phosphoranimine compound is a liquid at the intended use temperature (e.g., operation temperature). The cationic portion and the anionic portion of the phosphoranimine compound may also provide the phosphoranimine compound with sufficient electrochemical stability for use in the energy storage device.

The pendant groups ($R^1$-$R^4$) and X group on the phosphoranimine compound may be selected based on desired properties of the phosphoranimine compound. In addition to being a liquid at room temperature and at the temperature of use, the phosphoranimine compound may exhibit a low viscosity at room temperature, a high lithium or sodium salt (or other alkali or alkaline earth metal salt) solubility, stability toward lithium or other desired metal, stability at high voltage (greater than approximately 4.5 V), low flammability, low volatility, good ion transport and cell cyclability properties, and good stability to water and air. A desired balance of these properties may be achieved by appropriately selecting each of $R^1$-$R^4$ and X.

The melting point of the phosphoranimine compound may be in a range of from approximately −30° C. to approximately 10° C. so that the phosphoranimine compound is a liquid at the temperature of use. However, the phosphoranimine compound may be used in an energy storage device, such as a battery, that operates at a temperature of from approximately −25° C. to approximately 150° C.

The viscosity of the phosphoranimine compound at 20° C. may be similar to that of water, such as within a range of from about 1 centipoise (cP) (about 0.001 Pa·s) to about 30 cP (about 0.03 Pa·s) at room temperature (from about 20° C. to about 25° C.), such as from about 1 cP (about 0.001 Pa·s) to less than or equal to about 10 cP (about 0.01 Pa·s) at room temperature or from about 1 cP (about 0.001 Pa·s) to less than or equal to about 7 cP (about 0.007 Pa·s) at room temperature. The viscosity of the phosphoranimine compound may be directly proportional to the molecular weight of the phosphoranimine compound, which is, in turn, affected by the molecular weight of the pendant groups. By minimizing the molecular weight of the pendant groups and, thus, the molecular weight of the phosphoranimine compound, the phosphoranimine compound may exhibit a viscosity within the desired range.

The phosphoranimine compound may exhibit sufficient electrochemical stability for use in the electrochemical environment of the energy storage device. For instance, the pendant groups may be selected such that the phosphoranimine compound has an effective metal (e.g., lithium) salt dissolution of at least about 0.5 M concentration at room temperature, such as from about 0.5 M to about 1.2 M. The metal salt may be a lithium salt, a sodium salt, other alkali metal, or alkaline earth metal, such as lithium hexafluorophosphate ($LiPF_6$), lithium tetrafluoroborate ($LiBF_4$), lithium perchlorate ($LiClO_4$,), or combinations thereof. If, however, the phosphoranimine compound is to be used as an additive of the electrolyte solution, the metal salt dissolution and viscosity of the phosphoranimine compound may be lesser and greater, respectively, than the above-mentioned ranges accounting for mixture effects with the electrolyte solution. The salt solubility of the phosphoranimine compound may also be improved by interactions with other components of the electrolyte solution. However, the phosphoranimine compound may still have the ability to desolvate from the lithium (or other metal) ions to enable adequate cycling efficiencies and allow acceptable rate capabilities. The high salt solubility of the phosphoranimine compound in a metal salt solution may enable the phosphoranimine compound to be substantially completely stable toward the metal. The phosphoranimine compound may also have a conductivity in a 1.0 M salt of at least about 5 mS/cm at room temperature.

The phosphoranimine compound may exhibit an increased flash point and a decreased flame duration, resulting in reduced flammability of the electrolyte solution. Depending on the pendant groups selected for $R^1$-$R^4$, the phosphoranimine compound may also be insoluble in non-polar organic solvents, such as toluene or a hexane. The phosphoranimine compound may be soluble in polar organic solvents, such a tetrahydrofuran or chloroform.

The phosphoranimine compound may provide a good ion cyclability in the energy storage device, such as at least a C/1 equivalent cycling rate. For use in vehicles, the phosphoranimine compound may exhibit at least a C/1 equivalent cycling rate. However, when used in consumer electronics, the phosphoranimine compound may exhibit a lower cycling rate.

By appropriately selecting each of $R^1$-$R^4$ and X, the phosphoranimine compound may be produced that is both a liquid at room temperature and exhibits good stability in water and air. This stability in water and air was unexpected because conventional phosphoranimine compounds that may be liquids at room temperature are not stable in water and air. Conversely, conventional phosphoranimine compounds that may be stable in water and air are not liquids at room temperature. In addition, the phosphoranimine compound exhibits desired properties, as described above, for use as an electrolyte or electrolyte solution. Thus, phosphoranimine compounds having a variety of $R^1$-$R^4$ groups may be tailored to achieve desired properties of the phosphoranimine compound. While phosphoranimine compounds having an imidazolinium group bonded to the phosphorus atom are known, phosphoranimine compounds having the imidazolinium group bonded to the nitrogen atom were previously thought to be unattainable because the resulting phosphoranimine compounds were expected to be unstable.

However, and without being bound by any theory, it is believed that the cationic pendant group $R^4$ may stabilize the double bond between the nitrogen atom and the phosphorus atom of the phosphoranimine compound. Thus, the phosphoranimine compound may be more stable (e.g., less reactive) in environments that include water, air, or both water and air.

The phosphoranimine compounds may be synthesized by conventional techniques, such as by the Staudinger reaction. By way of example only and as shown in FIG. 1, a phosphorus(III) compound is reacted with an azide to form a four-coordinate phosphorus(V) imine ($^+R^4N$=$PR^1R^2R^3X^-$) by the elimination of nitrogen from a phosphazide intermediate. The phosphorus(III) compound may be an organophosphine and is oxidized by the azide to form the phosphoranimine compound. The organophosphine may function as a source of the $R^1$-$R^3$ groups, and the azide may function as a source of the $R^4$ group and the X group of the phosphoranimine compound. The phosphorus(III) compound having the desired $R^1$-$R^3$ pendant groups may be synthesized by conventional techniques or may be commercially available, such as from Sigma-Aldrich Chemical Co. or Strem Chemicals, Inc. In one embodiment, the phosphorus(III) compound is bis(2-(methoxyethoxy)ethoxy)ethylphosphine. In another embodiment, the phosphorus(III) compound is tri-n-octylphosphine. In yet another embodiment, the phosphorus(III) compound is triphenylphosphine.

Figure 2:
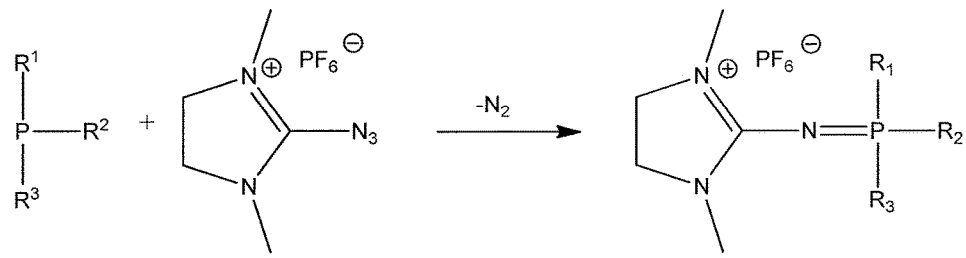
FIG. 2 illustrates a general method of synthesizing phosphoranimine compounds according to embodiments of the disclosure using 2-azido-1,3-dimethylimidazolinium hexafluorophosphate as an azide reagent.
Figure 3:
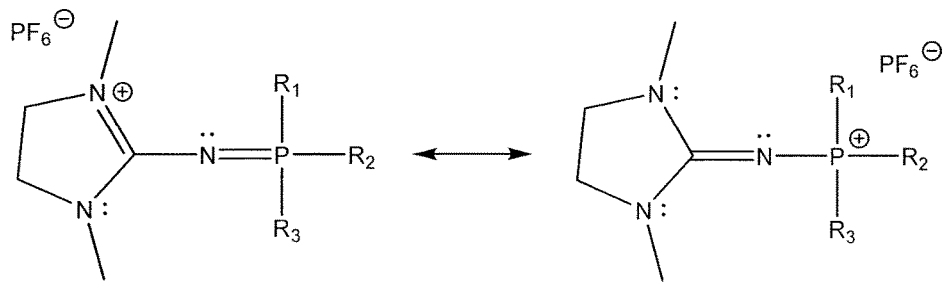
FIG. 3 illustrates a possible resonance structure of the phosphoranimine compounds of FIG. 2.

The azide may be synthesized by conventional techniques or may be commercially available, such as from Sigma-Aldrich Chemical Co. In one embodiment, the azide is 2-azido-1,3-dimethylimidazolinium hexafluorophosphate (DMIm-$N_3PF_6$). By way of example only and as shown in FIG. 2, the phosphorus(III) compound is reacted with DMIm-$N_3PF_6$ as the azide to produce a dimethylimidazolinium hexafluorophosphate phosphoranimine compound. A possible resonance structure of the dimethylimidazolinium hexafluorophosphate phosphoranimine compound is shown in FIG. 3.

Using the Staudinger reaction to produce phosphoranimine compounds has conventionally been avoided due to explosive properties of the azide. However, azide reagents in solution are commercially available or azides having low shock hazards may be used to produce the phosphoranimine compound according to embodiments of the disclosure. For instance, DMIm-$N_3$ $PF_6$, which is stable as a solid, is commercially available from Sigma-Aldrich Chemical Co. The commercially available azides may be available at a purity of greater than about 99%, such as greater than about 99.5% or greater than about 99.9%. By using high purity reagents, the phosphoranimine compound according to embodiments of the disclosure may be produced at a high purity, reducing or eliminating purification acts needed to produce the phosphoranimine compound. Since the phosphoranimine compound produced is of high purity, minimal workup or purification of the phosphoranimine compound is needed. The Staudinger reaction may also be used to produce the phosphoranimine compound according to embodiments of the disclosure as a single compound and at kilogram or greater amounts, if a continuous flow reactor is used. The Staudinger reaction may also be used to produce the phosphoranimine compound according to embodiments of the disclosure in a single act.

At least one phosphoranimine compound may be used as an additive in the electrolyte solution, as a co-solvent in the electrolyte solution, or as the primary solvent in the electrolyte solution. If the phosphoranimine compound is used as an additive, the phosphoranimine compound may be present in the electrolyte solution at from about 0.1% by weight (wt %) to about 15 wt %, such as from about 5 wt % to about 15 wt % or from about 1 wt % to about 10 wt %. If the phosphoranimine compound is used as a co-solvent, the phosphoranimine compound may be present in the electrolyte solution at from greater than about 15 wt % to less than about 50 wt %, such as from about 20 wt % to about 25 wt % or from about 25 wt % to about 35 wt %. If the phosphoranimine compound is used as the primary solvent, the phosphoranimine compound may be present in the electrolyte solution at greater than or equal to about 50% by volume, such as from about 55 wt % to about 100 wt % or from about 75 wt % to about 95 wt %. The electrolyte solution may also include a mixture of phosphoranimine compounds according to embodiments of the disclosure.

In addition to the phosphoranimine compound, the electrolyte solution may include a metal salt and an organic solvent. The metal salt may be a salt of lithium, sodium, magnesium, other alkali metal or alkaline earth metal, or combinations thereof. By way of example only, the lithium salt may be lithium hexafluorophosphate ($LiPF_6$), lithium tetrafluoroborate ($LiBF_4$), lithium perchlorate ($LiClO_4$,), or combinations thereof. The metal salt or combinations of metal salts may be present in the electrolyte solution at a concentration of from about 0.5 M to about 1.2 M, such as from about 0.8 M to about 1.1 M. The organic solvent may be stable at the operating temperature and operating voltage of the energy storage device. As examples, the organic solvent may be an organic carbonate including, but not limited to, ethylene carbonate (EC), ethyl methyl carbonate (EMC), dimethyl carbonate (DMC), diethyl carbonate (DEC), propylene carbonate (PC), or combinations thereof. The organic solvent may also be a linear ester compound, such as methyl butyrate (MB), singly or in mixtures with other esters or carbonates. The organic solvent may account for from about 1 wt % to about 90 wt % of the electrolyte solution, such as from about 10 wt % to about 70 wt % of the electrolyte solution.

The electrolyte solution including the phosphoranimine compound may be used as a solvent in an energy storage device, such as in a lithium battery, capacitor, ultracapacitor, or supercapacitor. The term "lithium battery" means and includes a lithium-ion battery or a lithium metal battery, each of which is known in the art and, therefore, is not described in detail herein. However, the electrolyte solution may be used in other types of energy storage devices, such as a sodium-ion battery, a sodium metal battery, a magnesium-ion battery, or a magnesium metal battery. The energy storage device may be used by way of non-limiting example in a vehicle, such as a car (private, commercial, fleet, or military), an aircraft, or a watercraft. The energy storage device may be a replacement for conventional nickel-metal hydride batteries, lead-acid batteries, or nickel-cadmium batteries.

In situations where the phosphoranimine compound is an additive or a co-solvent, the electrolyte solution may be prepared by dissolving the at least one phosphoranimine compound and the metal salt in the organic solvent. When the phosphoranimine compound and metal salt are dissolved, the electrolyte solution is configured to function as a liquid that carries electricity in the energy storage device. In situations where the phosphoranimine compound is a primary solvent, the electrolyte solution may be prepared by combining the phosphoranimine compound and the metal salt.

Figure 4:
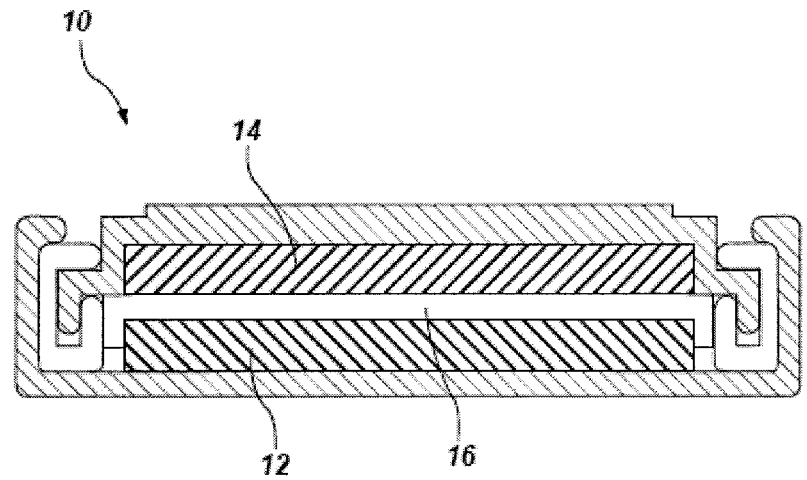
FIG. 4 is a schematic illustration of an energy storage device according to embodiments of the disclosure.

The electrolyte solution including the phosphoranimine compound may be used in an energy storage device 10 (e.g., a battery) that includes a positive electrode 12 (e.g., a cathode), a negative electrode 14 (e.g., an anode) separated from the positive electrode 12, and an optional separator 16 between the electrodes 12, 14, as shown in FIG. 4. The electrolyte solution may be positioned in the separator 16 but is in contact with the positive electrode 12 and the negative electrode 14. By way of example, the energy storage device 10 may be a lithium battery containing the electrolyte solution. The electrolyte solution including the phosphoranimine compound of the disclosure may exhibit a higher stability and longer cycle life than conventional electrolyte solutions.

The electrolyte solution may be prepared by dissolving the phosphoranimine compound in a solvent that is stable at the operation temperature and operation voltage of the energy storage device 10. When the phosphoranimine compound is dissolved, the electrolyte solution is configured to function as a liquid that carries electricity in the energy storage device. The solvent may be a water-miscible solvent, such as ethylene carbonate (EC) or ethyl methyl carbonate (EMC), a low molecular weight organic solvent, such as an organic carbonate, an ester, or an ether, a siloxane, or combinations thereof. The solvent may have a molecular weight of less than about 150. The solvent may account for from approximately 1 wt % to approximately 90 wt % of the electrolyte solution, such as from approximately 10 wt % to approximately 70 wt % of the electrolyte solution. The phosphoranimine compound may account for from approximately 1 wt % to approximately 90 wt % of the electrolyte solution.

While embodiments of the disclosure describe the phosphoranimine compound as being used as an electrolyte or as an electrolyte in an electrolyte solution, the phosphoranimine compound may also be used as a solvent, an extractant, a lubricant, or in micellar technologies, such as for drug delivery systems, immunoadjuvants, or active transport of gases or liquids. By appropriately selecting each of $R^1$-$R^4$, the properties of the phosphoranimine compound may be tailored for use as the electrolyte, low volatile solvent, extractant, lubricant, or in the micellar technology. By way of example only, the phosphoranimine compound may be used as a solvent, such as in dissolution of polymer or biomass materials. Since the phosphoranimine compound exhibit flame-retardant properties, the phosphoranimine compound may be used as a lubricant.

The following examples serve to explain embodiments of the disclosure in more detail. These examples are not to be construed as being exhaustive or exclusive as to the scope of this disclosure.

EXAMPLES

The following reagents were obtained from commercial sources and used without further purification: 2-azido-1,3-dimethylimidazolinium hexafluorophosphate (DMIm-$N_3$ $PF_6$; Sigma-Aldrich Chemical Co.), sodium hydride (NaH; 60% in oil; Sigma-Aldrich Chemical Co.), dichloroethylphosphine ($EtPCl_2$; Sigma-Aldrich Chemical Co.), triphenylphosphine ($P(C_6H_5)_3$; Sigma-Aldrich Chemical Co.), and tri-n-octylphosphine ($[CH_3(CH_2)_7]_3P$; Strem Chemicals, Inc.). DMIm-$N_3$ $PF_6$ is a white solid that is stable toward moisture and the atmosphere at low humidity. However, the DMIm-$N_3$ $PF_6$ was kept at 0° C. for long term storage. 2-(methoxyethoxy)ethanol (DEG) was obtained from Sigma-Aldrich Chemical Co. and purified by vacuum distillation. Anhydrous solvents, such as diethyl ether, toluene, tetrahydrofuran, and hexane, were obtained from Sigma-Aldrich Chemical Co. and used as received. Proton, $^{13}C\{^1H\}$, and $^{31}P\{^1H\}$ NMR spectra were recorded on a Bruker ASCEND™ AVANCE™ III 600 MHz spectrometer.

A series of dimethylimidazolinium hexafluorophosphate phosphoranimine compounds was produced by the Staudinger reaction as described below. Phosphine compound starting materials that could not be obtained commercially were prepared by the methods described in Example 1 prior to doing the Staudinger reaction.

Example 1

Synthesis of Bis(2-(methoxyethoxy)ethoxy)ethylphosphine ($EtP(DEG)_2$)

A 250 ml three-necked, round bottom flask, equipped with a gas inlet, 125 ml addition funnel, magnetic stir bar, and a rubber septum was purged with nitrogen. 100 ml of anhydrous diethyl ether was introduced into the flask, and sodium hydride (60% in oil, 9.2 g) was added directly into the flask. Distilled DEG (27.2 ml, 0.23 mol) was added in the addition funnel by syringe, and the alcohol was added slowly into the flask. An ice bath was used to suppress the heating. Upon completion, the funnel was washed with 30 ml of diethyl ether and the solution was allowed to warm to room temperature overnight. Next day, the solution was cooled to 0° C. for 10 minutes, and $EtPCl_2$ (10 ml, 12.6 g, 0.096 mole) was added by syringe to the addition funnel. The $EtPCl_2$ solution was added dropwise to the flask with stirring. After the addition, the funnel was washed with 50 ml of anhydrous diethyl ether solution and warmed to room temperature overnight. The next day, the stirring was stopped and the salts settled to the bottom of the flask. The supernatant was transferred to another 250 ml round bottom flask, where the solvent was removed by reduced pressure leaving behind an oil. Fractional distillation under vacuum yielded $EtP(DEG)_2$ as a colorless, clear liquid.

Example 2

Synthesis of PA-IL1

A 50 ml two-necked, round bottom flask, water condenser equipped with a gas inlet, magnetic stir bar, and a rubber septum was purged with nitrogen. Anhydrous toluene (10 ml) was introduced into the flask by syringe, and then DMIm-$N_3PF_6$ (2.0 g, 0.007 mol) was added directly into the flask. The azide had limited solubility in toluene, producing a slurry. The $EtP(DEG)_2$ (2.53 g, 0.007 mol) of Example 1 was added dropwise by syringe into the flask. As the phosphine addition progressed, an intense yellow color was observed during the reaction. The yellow color subsided as the phosphorus(III) compound reacted with the azide. After the phosphorus(III) compound was added, the reaction was heated to near reflux. No apparent off gassing (nitrogen) was observed as the reaction was heated to reflux. The reaction was refluxed overnight under nitrogen. Next day, the heating was removed and the reaction was allowed to cool to room temperature. Stirring was stopped and two phases were observed. The bottom phase was a clear, colorless liquid of the phosphoranimine compound (PA-IL1), and was pipetted out of the flask and transferred to a 20 ml scintillation vial. The PA-IL1 was washed twice with 10-15 ml of hexanes.

The chemical structure of PA-IL1 is:

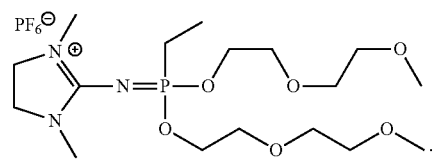 [SMILES: CCP(=NC1=[N+](C)CCN1C)(OCCOCCOC)OCCOCCOC ; "PF6"]

PA-IL1 may also be represented by the resonance structure shown below:

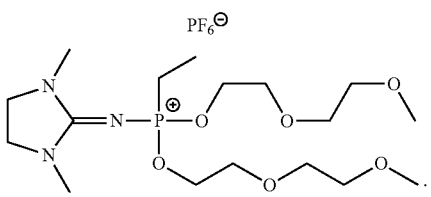 [SMILES: CC[P+](N=C1N(C)CCN1C)(OCCOCCOC)OCCOCCOC ; "PF6"]

PA-IL1 was a liquid at 25° C., had a viscosity of about 6 cP at 20° C., and was not soluble in toluene. In addition, PA-IL1 remained a liquid at −20° C. The low viscosity of PA-IL1 was unexpected because phosphoranimine compounds that are ionic liquids at room temperature conventionally exhibit higher viscosities. PA-IL1 was also unexpectedly found to be stable in air and water.

Example 3

Synthesis of PA-IL2

A 50 ml two-necked, round bottom flask, water condenser equipped with a gas inlet, magnetic stir bar, and a rubber septum was purged with nitrogen. Anhydrous toluene (10 ml) was introduced into the flask by syringe, and then DMIm-N$_3$PF$_6$ (2.0 g, 0.007 mol) was added directly into the flask. The DMIm-N$_3$PF$_6$ had limited solubility in toluene, producing a slurry. Tri-n-octylphosphine (3.12 ml, 2.6 g, 0.007 mol) was added dropwise by syringe into the flask. As the phosphorus(III) compound addition progressed, an intense yellow color was observed during the reaction resulting in a yellow slurry. The yellow color subsided 20-30 minutes after the phosphorus(III) compound was added, and the reaction was heated to near reflux. No apparent off gassing (nitrogen) was observed as the reaction was heated to reflux. The reaction was refluxed overnight under nitrogen. Next day, the heating was removed and the reaction was allowed to cool to room temperature. Stirring was stopped and no phase separation was observed. The reaction solution was filtered, collected, and placed on the roto-evaporator to remove the toluene. The PA-IL2 was washed twice with 30-40 ml of hexanes, and the bottom phase was collected as a clear, colorless liquid.

The chemical structure of PA-IL2 is:

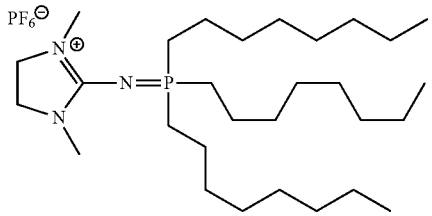

PA-IL2 may also be represented by the resonance structure shown below:

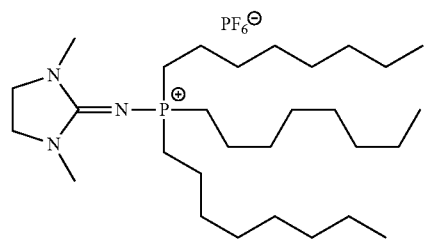

PA-IL2 was a liquid at 25° C. PA-IL2 was unexpectedly found to be stable in air and water. PA-IL2 had a slightly higher viscosity than PA-IL1 and was soluble in toluene.

Example 4

Synthesis of PA-IL3

A 50 ml two-necked, round bottom flask, water condenser equipped with a gas inlet, magnetic stir bar, and a rubber septum was purged with nitrogen. Anhydrous toluene (10 ml) was introduced into the flask by syringe, and then DMIm-N$_3$PF$_6$ (2.0 g, 0.007 mol) was added directly into the flask. The DMIm-N$_3$PF$_6$ had limited solubility in toluene, producing a slurry. Triphenylphosphine (1.9 g, 0.007 mol) was dissolved in 10 ml of anhydrous toluene and the solution was added dropwise by syringe into the flask. As the phosphorus(III) compound addition progressed, an intense yellow color was observed during the reaction. Off gassing (nitrogen) was observed as the reaction was heated to reflux. The reaction was refluxed and monitored for one hour and then refluxed overnight under nitrogen. The yellow color subsided as the reaction was refluxed overnight. Next day, the heating was removed and the reaction was allowed to cool to room temperature. The PA-IL3 precipitated as a white solid. Excess toluene was removed and the PA-IL3 washed twice with 30-40 ml of hexanes. The white solid was collected and crystallized in tetrahydrofuran. The prismatic crystals had a melting point of 185° C.

The chemical structure of PA-IL3 is:

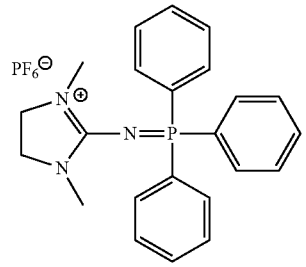

PA-IL3 may also be represented by the resonance structure shown below:

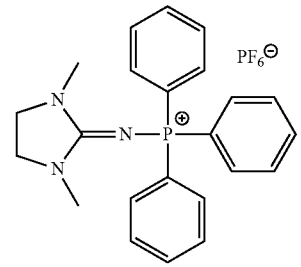

PA-IL3 was stable in air and was a crystalline solid at 25° C.

Example 5

Electrochemical Cyclability of PA-IL1

The suitability of PA-IL1 as a possible replacement for carbonate electrolytes was determined. An electrolyte blend of PA-IL1 with carbonates was tested in a 2032-type coin cell having an NMC-based cathode/graphite anode with a voltage range between 3.0 V and 4.2 V. Assembled cells underwent conventional formation cycling to produce protective passivation films, then completed a matrix of cycling rates to investigate both cell polarization and aging. A "C" rate is defined here as the rated energy capacity, generally the discharge capacity, attainable in fully discharging a cell in one hour (C/1 reference). Thus, C/10 would represent a 10-hour discharge at a current one-tenth that of the C/1 reference, C/5 would represent a 5-hour discharge at a current one-fifth that of the C/1 reference, and C/2 would represent a 2-hour discharge at a current one-half that of the C/1 reference.

Figure 5:
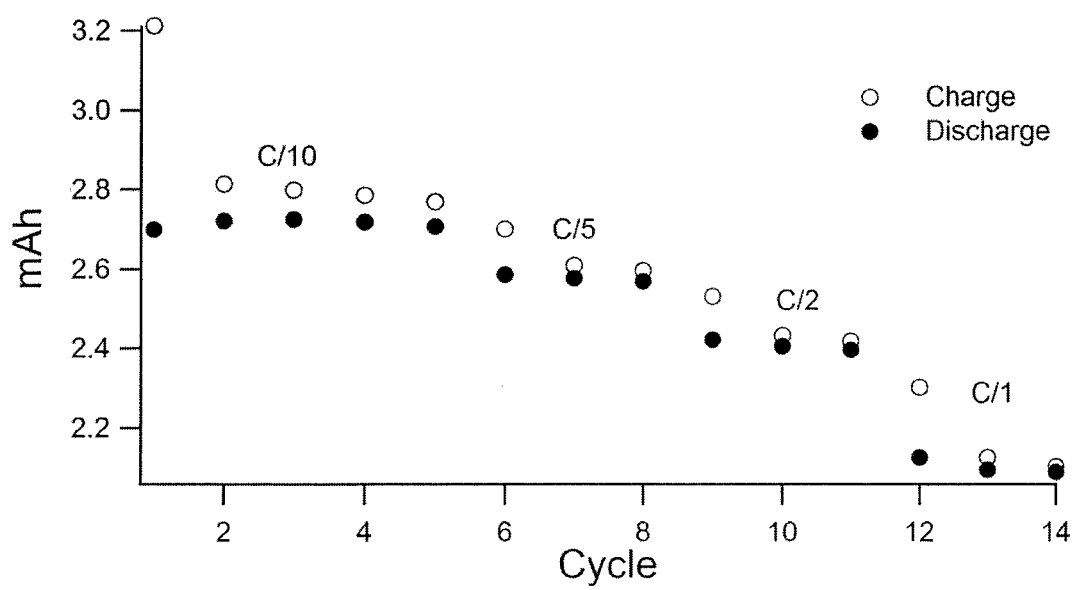
FIG. 5 is a graph showing capacity results for an electrolyte solution including a phosphoranimine compound according to an embodiment of the disclosure.

The electrolyte blend of PA-IL1 included 4:3:3:6 PA-IL1: fluoroethylene carbonate:ethylene carbonate:ethylmethyl carbonate and 1.1 M LiPF$_6$. Cycles 1-5 were conducted at a C/10 rate, cycles 6-8 were conducted at a C/5 rate, cycles 9-11 were conducted at a C/2 rate, and cycles 12-14 were conducted at a C/1 rate. FIG. 5 shows the capacity results for PA-IL1, indicating that the electrolyte blend of PA-IL1 and the carbonates was suitable as a replacement for carbonate electrolytes for Li-ion systems and potentially for other ion-based systems, such as Na-ion and Mg-ion.

While the disclosure may be susceptible to various modifications and alternative forms, specific embodiments have been shown by way of example in the Examples and drawings and have been described in detail herein. However, it should be understood that the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A phosphoranimine compound comprising a cationic portion bonded to a nitrogen atom of the phosphoranimine compound, a phosphorus atom bonded to the nitrogen atom, pendant groups bonded to the phosphorus atom, and a counterion, the cationic portion comprising an imidazolinium group, an imidazolium group, a phosphonium group, an ammonium group, a sulfonium group, a triazolium group, a thiazolium group, a pyridium group, a pyridinium group, an isoquinolinium group, a pyrrolidinium group, a pyrrolium group, a piperidinium group, or a pyrazolium group.

2. The phosphoranimine compound of claim 1, wherein the phosphoranimine compound is a liquid at a temperature from about 20° C. to about 25° C.

3. The phosphoranimine compound of claim 1, wherein the phosphoranimine compound exhibits a viscosity of from about 1 centipoise at room temperature to less than or equal to about 10 centipoise at room temperature.

4. An electrolyte solution comprising:
at least one phosphoranimine compound comprising:
a cationic portion bonded to a nitrogen atom, a phosphorus atom bonded to the nitrogen atom, pendant groups bonded to the phosphorus atom, and a counterion; and
a metal salt comprising an alkali metal salt, an alkaline earth metal salt, or a combination thereof.

5. The electrolyte solution of claim 4, wherein the cationic portion comprises an imidazolinium group, an imidazolium group, a phosphonium group, an ammonium group, a sulfonium group, a triazolium group, a thiazolium group, a pyridium group, a pyridinium group, an isoquinolinium group, a pyrrolidinium group, a pyrrolium group, a piperidinium group, or a pyrazolium group.

6. The electrolyte solution of claim 4, wherein the at least one phosphoranimine compound comprises the chemical structure:

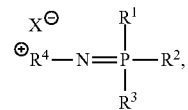

wherein $^+R^4$ comprises the cationic portion.

7. The electrolyte solution of claim 4, wherein the at least one phosphoranimine compound comprises the chemical structure:

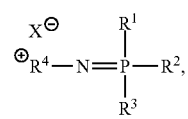

wherein
each of $R^1$, $R^2$, and $R^3$ is independently selected from the group consisting of an acyl group, an acylamino group, an acyloxy group, an alkyl group, an alkenyl group, an alkynyl group, an alkoxy group, an amino group, an alkylamino group, an alkylarylamino group, a dialkylamino group, an alkylthio group, an alkarylthio group, an aryl group, an arylamino group, a diarylamino group, an aryloxy group, an aralkyl group, an alkaryl group, an aralkoxy group, an alkaryloxy group, an arylthio group, an arylthio acyl group, an amino acid group, a carbamoyl group, a carbonamido group, a carboxyl group, a cyano group, a formyl group, a glycol group, a heteroalkyl group, a heteroaralkyl group, a heteroaryl group, a hydroxyl group, a nitro group, an oxy(aliphatic) group, an oxy(aliphatic)hydroxyl group, an oxy(alkyl)hydroxyl group, an oxycarbonyl group, an oxysulfonyl group, a perfluoroalkyl group, a phosphate group, a saccharide group, a sulfamoyl group, a sulfonamido group, a sulfonylamino group, a sulfonyl group, a sulfoxide group, a thio group, a thioalkaryl group, a thioaralkyl group, a trifluoroalkyl group, or an ureido group;

$R^4$ is the cationic portion; and

X is the counterion.

8. The electrolyte solution of claim 7, wherein each $R^1$, $R^2$, and $R^3$ is different.

9. The electrolyte solution of claim 7, wherein at least two of $R^1$, $R^2$, and $R^3$ are the same.

10. The electrolyte solution of claim 4, wherein the at least one phosphoranimine compound comprises

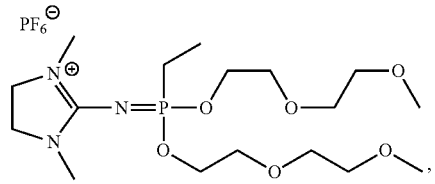

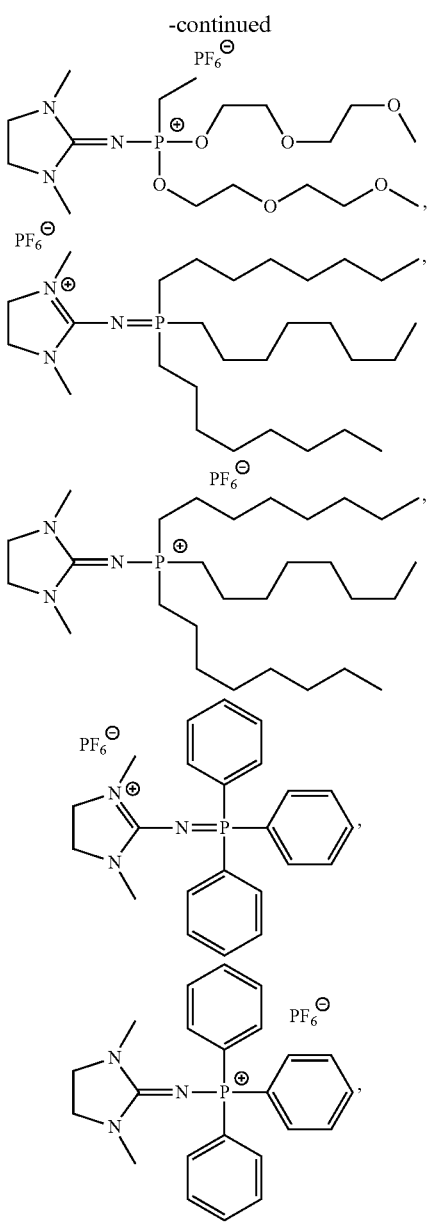

or combinations thereof.

11. The electrolyte solution of claim 4, wherein the at least one phosphoranimine compound comprises from about 0.1% by weight to less than about 15% by weight of the electrolyte solution.

12. The electrolyte solution of claim 4, wherein the at least one phosphoranimine compound comprises from greater than or equal to about 15% by weight to less than about 50% by weight of the electrolyte solution.

13. The electrolyte solution of claim 4, wherein the at least one phosphoranimine compound comprises greater than or equal to about 50% by weight of the electrolyte solution.

14. An energy storage device, comprising:
a positive electrode, a negative electrode, a separator between the positive electrode and the negative electrode, and an electrolyte solution, the electrolyte solution comprising:
at least one phosphoranimine compound comprising a cationic portion bonded to a nitrogen atom, a phosphorus atom bonded to the nitrogen atom, pendant groups bonded to the phosphorus atom, and a counterion, the counterion comprising tetrauoroborate ($BF_4^-$), hexafluorophosphate ($PF_6^-$), bis(oxalate)borate ($BOB^-$), hexafluoroarsenate ($AsF_6^-$), hexafluoroantimonate ($SbF_6^-$), tetrachloroaluminate ($AlCl_4^-$), hydrogen sulfate ($HSO_4^-$), perchlorate ($ClO_4^-$), mesylate ($CH_3SO_3^-$), chloride ($Cl^-$), bromide ($Br^-$), iodide ($I^-$), an alkyl halide, a perhalogenated alkyl halide of a group VA element, trifluoromethanesulfonyl imide ($N(SO_2CF_3)_2^-$), trifluoromethanesulfonate ($CF_3SO_3^-$), or trifluoroacetate ($CF_3CO_2^-$).

15. The energy storage device of claim 14, wherein the at least one phosphoranimine compound comprises the chemical structure:

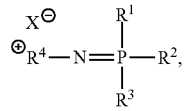

herein:
each of $R^1$, $R^2$, and $R^3$ is independently selected from the group consisting of an acyl group, an acylamino group, an acyloxy group, an alkyl group, an alkenyl group, an alkynyl group, an alkoxy group, an amino group, an alkylamino group, an alkylarylamino group, a dialkylamino group, an alkylthio group, an alkarylthio group, an aryl group, an arylamino group, a diarylamino group, an aryloxy group, an aralkyl group, an alkaryl group, an aralkoxy group, an alkaryloxy group, an arylthio group, an arylthio acyl group, an amino acid group, a carbamoyl group, a carbonamido group, a carboxyl group, a cyano group, a formyl group, a glycol group, a heteroalkyl group, a heteroaralkyl group, a heteroaryl group, a hydroxyl group, a nitro group, an oxy(aliphatic) group, an oxy(aliphatic)hydroxyl group, an oxy(alkyl)hydroxyl group, an oxycarbonyl group, an oxysulfonyl group, a perfluoroalkyl group, a phosphate group, a saccharide group, a sulfamoyl group, a sulfonamido group, a sulfonylamino group, a sulfonyl group, a sulfoxide group, a thio group, a thioalkaryl group, a thioaralkyl group, a trifluoroalkyl group, or an ureido group;
$R^4$ comprises an imidazolinium group, an imidazolium group, a phosphonium group, an ammonium group, a sulfonium group, a triazolium group, a thiazolium group, a pyridium group, a pyridinium group, an isoquinolinium group, a pyrrolidinium group, a pyrrolium group, a piperidinium group, or a pyrazolium group; and
X comprises the counterion.

16. The energy storage device of claim 14, wherein the electrolyte solution further comprises a metal salt and an organic solvent.

17. A phosphoranimine compound comprising a cationic portion bonded to a nitrogen atom of the phosphoranimine compound, a phosphorus atom bonded to the nitrogen atom, pendant groups bonded to the phosphorus atom, and a counterion, the counterion comprising tetrafluoroborate ($BF_4^-$), hexafluorophosphate ($PF_6^-$), bis(oxalate)borate ($BOB^-$), hexafluoroarsenate ($AsF_6^-$), hexafluoroantimonate ($SbF_6^-$), tetrachloroaluminate ($AlCl_4^-$), hydrogen sulfate ($HSO_4^-$), perchlorate ($ClO_4^-$), mesylate ($CH_3SO_3^-$), chloride (Cl⁻), bromide (Br⁻), iodide (I⁻), an alkyl halide, a perhalogenated alkyl halide of a group VA element, trifluoromethanesulfonyl imide (N(SO₂CF₃)₂⁻), trifluoromethanesulfonate (CF₃SO₃⁻), or trifluoroacetate (CF₃CO₂⁻).

18. The phosphoranimine compound of claim 17, wherein the phosphoranimine compound comprises the chemical structure:

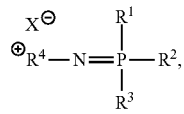

wherein:
each of R¹, R², and R³ is independently selected from the group consisting of an acyl group, an acylamino group, an acyloxy group, an alkyl group, an alkenyl group, an alkynyl group, an alkoxy group, an amino group, an alkylamino group, an alkylarylamino group, a dialkylamino group, an alkylthio group, an alkarylthio group, an aryl group, an arylamino group, a diarylamino group, an aryloxy group, an aralkyl group, an alkaryl group, an aralkoxy group, an alkaryloxy group, an arylthio group, an arylthio acyl group, an amino acid group, a carbamoyl group, a carbonamido group, a carboxyl group, a cyano group, a formyl group, a glycol group, a heteroalkyl group, a heteroaralkyl group, a heteroaryl group, a hydroxyl group, a nitro group, an oxy(aliphatic) group, an oxy(aliphatic)hydroxyl group, an oxy(alkyl)hydroxyl group, an oxycarbonyl group, an oxysulfonyl group, a perfluoroalkyl group, a phosphate group, a saccharide group, a sulfamoyl group, a sulfonamido group, a sulfonylamino group, a sulfonyl group, a sulfoxide group, a thio group, a thioalkaryl group, a thioaralkyl group, a trifluoroalkyl group, or an ureido group;
R⁴ comprises the cationic portion; and
X comprises the counterion.

19. The phosphoranimine compound of claim 18, wherein R⁴ comprises an imidazolinium group, an imidazolium group, a phosphonium group, an ammonium group, a sulfonium group, a triazolium group, a thiazolium group, a pyridium group, a pyridinium group, an isoquinolinium group, a pyrrolidinium group, a pyrrolium group, a piperidinium group, or a pyrazolium group.

20. The phosphoranimine compound of claim 18, wherein R⁴ comprises a substituted imidazolinium group.

21. The phosphoranimine compound of claim 18, wherein R⁴ comprises a dimethylimidazolinium group.

* * * * *